No. 750,201. PATENTED JAN. 19, 1904.
J. P. KLINE.
MANUFACTURE OF HOPPLE LOOPS.
APPLICATION FILED MAY 1, 1903.
NO MODEL.
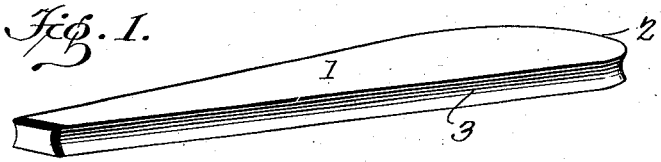
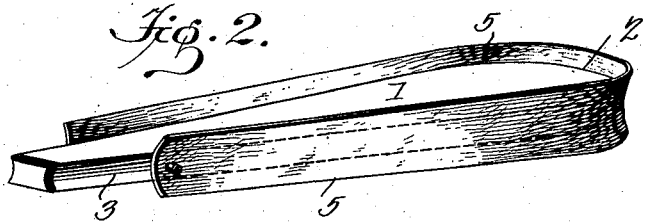
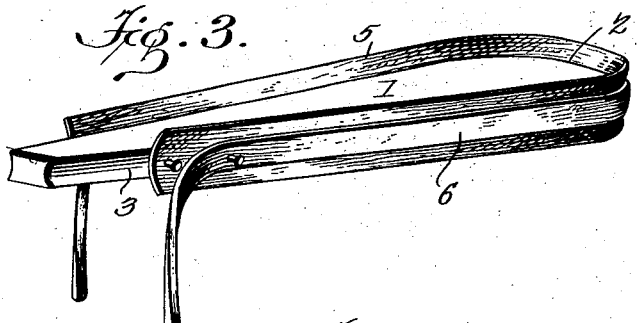
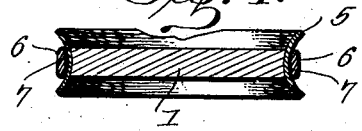
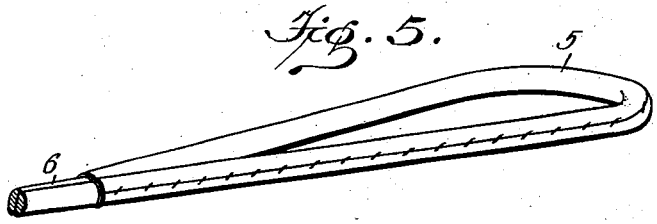
Witnesses
E. F. Stewart
Wm Bagger
John P. Kline, Inventor.
by C. A. Snow & Co
Attorneys No. 750,201.

Patented January 19, 1904.

UNITED STATES PATENT OFFICE.

JOHN P. KLINE, OF BROOKLYN, MICHIGAN.

MANUFACTURE OF HOPPLE-LOOPS.

SPECIFICATION forming part of Letters Patent No. 750,201, dated January 19, 1904.

Application filed May 1, 1903. Serial No. 155,179. (No model.)

*To all whom it may concern:*

Be it known that I, JOHN P. KLINE, a citizen of the United States, residing at Brooklyn, in the county of Jackson and State of Michigan, have invented a new and useful Improvement in the Manufacture of Hopple-Loops, of which the following is a specification.

This invention relates to the manufacture of hopple-loops; and it has for its object to provide a loop adapted especially to be used in connection with that class of hopples which comprise in their construction a light harness carried by the horse and supporting the said loops through which the legs of the animal are passed, thereby restraining the movement sufficiently to prevent the animal from straying. This class of loops as ordinarily constructed have consisted of a filling and a covering, the latter stitched around the filling, so as to form a line, which has then been bent or doubled upon itself and the ends connected, so as to form a loop. By this method of construction an obvious disadvantage has arisen—namely, that in the process of bending the covering material would become crimped or crinkled upon the inner surface of the loop, which when the device is in use is in contact with the leg of the horse, thus eventually chafing the leg, rubbing the hair off, and otherwise disfiguring.

In my present improvement the hopple-loop is so constructed that this inner surface shall be entirely smooth and free from crimps or wrinkles, thus obviating the disadvantages referred to and contributing to the construction of a hopple which shall possess decided advantages in point of simplicity, durability, and efficiency.

With these ends in view my invention consists in the improved method of manufacturing hopple-loops which will be hereinafter fully described, and particularly pointed out in the claims.

In the accompanying drawings, Figure 1 is a perspective view of a former which is used in carrying out my invention. Fig. 2 is a perspective view showing the outer or covering strip applied to the former. Fig. 3 is a perspective view of the former with the covering-strip and filling in position and ready for stitching. Fig. 4 is a transverse sectional view taken on the line 4 4 in Fig. 3. Fig. 5 is a perspective view showing my improved hopple-loop finished.

Corresponding parts in the several figures are indicated by similar numerals of reference.

In carrying out my invention I provide a former, which is clearly illustrated in Fig. 1 of the drawings, where it is designated 1, and which consists of a board of the desired size and shape to give the desired size and shape to the loop—that is, an elongated board wider at one end than at the other end, rounded at its wide end, as at 2, and provided along its side edges and its rounded end with a groove 3, which is segmental in cross-section, as will be seen by reference to Fig. 4 of the drawings. In this groove 3 is placed a covering-strip 5, of soft pliable leather, which is forcibly stretched in the direction of the narrow end of the former-board, where the ends of said strip are temporarily made fast by means of brads or in any other suitable manner. The covering-strip may be dampened previous to applying it to the former-board in order to enable it to be stretched taut and also to assist it in retaining its shape; but this is not absolutely necessary and may be optional with the operator. It will be understood that by this preliminary stretching of the covering-strip the leather is induced to enter the groove in the sides and end of the former-board, the edges of said strip extending above and below the latter, as will be seen in Fig. 2 of the drawings. I next apply a filling-strap 6, which is longer than the covering-strip and which is stretched tightly upon the former-board, so as to positively force the covering-strip into the groove of the latter, where it is positively retained by the said strap while the stitching operation is going on. Prior to this it is obvious that the ends of the filling-strap are to be temporarily made fast, which may be done by means of brads or in any other suitable mannner. I also prefer to apply between the strip 5 and the strap 6 a coat of cement 7 for the obvious purpose of intimately uniting the said parts and also to positively prevent displacement during the operation of stitching. The filling-strap having been applied in the manner described, the edges of the covering-strip are folded over it and stitched in the usual manner. After the completion of the stitching the loop may be suffered to remain for some time upon the former-board in order to cause it to so thoroughly acquire the proper shape as to hold its shape when it is subjected to use. This, however, is not considered absolutely essential, inasmuch as I have found by experience that the device may be removed from the former-board soon after the completion of the stitching and yet have acquired what I call a "permanent" shape.

After the device is removed from the former-board all that remains is to trim the ends of the covering-strip and to stitch the ends of the filling-strap together, thus forming the complete loop illustrated in Fig. 5 of the drawings.

It will be observed that by this method of construction a loop will be formed which is absolutely and permanently free from crimps or wrinkles upon its inner side, which in practice is in contact with the legs of the animal. Consequently a hopple the construction whereof embodies my improved loops may be worn by an animal without danger of injury or disfigurement, which latter, as is well known, oftentimes greatly reduces the commercial value of an animal.

Having thus described my invention, I claim—

1. The described improvement in the manufacture of hopple-loops, which consists in first bending to a loop shape having an exterior segmental groove an outer strip or covering, next stretching over the same, and in the segmental groove, a filling-strap, and next, while thus stretched, stitching the edges of the covering-strip together over the filling-strap.

2. The described improvement in the manufacture of hopple-loops, which consists in first bending to a loop shape having an exterior segmental groove a covering-strip, stretching the same and securing the ends thereof, next stretching over the same and in the segmental groove thereof a filling-strap and securing the ends of the latter, and then stitching the edges of the covering-strip together over the filling-strap.

3. The described method of manufacturing a hopple-loop, which consists in first bending to the desired shape, stretching and temporarily securing the ends of a covering-strip, next bending and stretching over the same a filling-strap and temporarily securing the ends of the same, next stitching the edges of the covering-strip over the filling-strap, next releasing the attached ends of the covering-strip and the filling-strap, trimming the ends of the covering-strip and finally securing together the ends of the filling-strap.

4. The described improvement in the manufacture of hopple-loops, which consists in first bending to a loop shape having an exterior segmental groove a covering-strip, stretching the same and securing the ends thereof, next applying a coat of cement, next stretching over the same and in the segmental groove of the covering-strip a filling-strap and securing the ends of the latter and then stitching the edges of the covering-strip together over the filling-strap.

In testimony that I claim the foregoing as my own I have hereto affixed my signature in the presence of two witnesses.

JOHN P. KLINE.

Witnesses:
ELMER J. WILBER,
JOE S. NORTH.